United States Patent [19]

Herrmann

[11] 3,845,970

[45] Nov. 5, 1974

[54] SHOCK ABSORPTION SYSTEM FOR A MOTOR VEHICLE

[75] Inventor: Günter Herrmann, Ottobrun, Germany

[73] Assignee: Bayern-Chemie Gesellschaft Fur Flugchemische Antriebe Mit Beschrankter Haftung, Oschau, Germany

[22] Filed: Oct. 4, 1972

[21] Appl. No.: 294,908

[30] Foreign Application Priority Data
Oct. 9, 1971 Germany.......................... 2150463

[52] U.S. Cl. .............. 280/150 AB, 23/281, 102/39, 102/100, 149/19, 280/87 R
[51] Int. Cl. ............................................ B60r 21/08
[58] Field of Search ............... 280/150 AB; 23/281; 102/39; 149/19

[56] References Cited
UNITED STATES PATENTS

| | | | |
|---|---|---|---|
| 3,453,156 | 7/1969 | Hackett | 149/19 |
| 3,454,436 | 7/1969 | Bedell | 149/19 |
| 3,454,437 | 7/1969 | Yamazaki | 149/19 |
| 3,558,285 | 1/1971 | Ciccone et al. | 280/150 AB |
| 3,647,393 | 3/1972 | Leising | 102/39 |
| 3,649,045 | 3/1972 | Smith | 280/150 AB |
| 3,692,495 | 9/1972 | Schneiter et al. | 280/150 AB |
| 3,692,597 | 9/1972 | Brockway | 149/19 |
| 3,715,131 | 2/1973 | Hurley | 280/150 AB |
| 3,723,205 | 3/1973 | Scheffee | 280/150 AB |

Primary Examiner—David Schonberg
Assistant Examiner—John P. Silverstrim
Attorney, Agent, or Firm—Toren, McGeady and Stanger

[57] ABSTRACT

In a shock absorption system for use in minimizing the danger of injuries to occupants in motor vehicles in the event of an accident, an inflatable bag is connected to a gas generator housing. A solid charge is positioned within a reaction chamber in the gas generator housing and an ignition device is associated with the reaction chamber for initiating the generation of gas from the solid charge. Openings connect the reaction chamber with the interior of the inflatable bag and closure members are retained across the openings until the initiation of the gas generating process. Various combinations of chemicals can be used as the solid charge.

10 Claims, 2 Drawing Figures

SHOCK ABSORPTION SYSTEM FOR A MOTOR VEHICLE

SUMMARY OF THE INVENTION

The present invention is directed to a shock absorption system for use in a motor vehicle so that the danger of injury to occupants of the vehicle in the event of an accident can be reduced to a minimum and, in particular, the invention is directed to an inflatable bag, a device containing a solid charge for generating gas used for inflating the bag, and an accident sensor, such as an inertial sensor, which initiates the inflating operation.

It is known that the occupants of a vehicle involved in a collision are thrown forward in an average period of about 30 milliseconds. The consequences of collisions can be severe and often result in fatal injuries. The severity of the injuries experienced, however, can be avoided by the installation of a shock absorption system within certain portions of the vehicle, such as the steering wheel, the instrument panel and the front seat backrests. In such a shock absorption system, a bag inflatable upon the occurrence of the accident, provides a yielding or cushioning barrier for retarding, within human tolerances, the forward movement of the vehicle occupants caused by the accident.

In a number of known shock absorption systems in which the inflatable member is supplied with gas, the following have been the main sources of gas:

a. high pressure bottles filled with nitrogen;
b. pressure tanks containing liquid refrigerants and followed by evaporators; and
c. materials in a solid state of aggregation installed inside the bag and producing low pressure gas chemically, electrochemically or by combustion technology.

The sources of gas listed in items (a) and (b) above have two very serious disadvantages. First, the use of such gas sources in shock absorption systems for motor vehicles are extremely temperature dependent for the inflating process. Secondly, due to sealing problems, pressure losses are practically unavoidable in the gas-filled high pressure bottles as well as in the liquid-filled pressure tank. Statistically, there is a relatively long time period between collisions involving the same vehicle and such pressure losses reach an extent which impairs or negates the protection the shock absorption system is intended to provide. In addition, the presence of pressure bottles or tanks in a motor vehicle is another source of danger to its occupants because of the possibility that a bottle or tank might break at any time.

With regard to the source of gas listed under item (c) above, the placement of the gas-producing material within the inflatable bag represents, on one hand, a considerable additional mechanical stress on the bag. On the other hand, it involves the danger of thermally overstressing the bag by the gases produced within it when the bag is already greatly stressed mechanically so that its tear strength is weakened. Accordingly, it is necessary to provide an intensive cooling of the gas, however, such a procedure is itself a source of problems. Finally, the relatively low speed of generation of the low pressure gas inherent in such a gas source makes it questionable whether the bag can be inflated within the extremely short time period between the occurrence of the accident and the commencement of the forward movement of the occupants caused by the accident.

Therefore, the primary object of the present invention is to avoid the disadvantages experienced in the shock absorption systems and to develop a system which functions reliably and is of a simple construction.

In accordance with the present invention, gas is produced from a solid charge located within a reaction chamber separated from the interior of the inflatable bag with the housing forming the reaction chamber having one or a number of outlet openings for introducing the gas from the reaction chamber into the inflatable bag.

The shock absorption system of the present invention is characterized by a number of advantages, for example, its compactness due to the small volume of the gas generating device. Due to its small size, the shock absorption system can be installed within the existing parts of the vehicle such as its steering wheel, glove compartments and the like. Furthermore, the placement of the gas generating means within the reaction chamber separate from the interior of the inflatable bag protects the material of the bag against mechanical as well as excessive thermal stress. Such an arrangement not only reliably eliminates secondary injuries to vehicle occupants due to the rupture of gas-filled high pressure bottles or liquid-filled pressure tanks, but also secondary injuries resulting from the premature rupture of the inflatable bag. The reduction in mechanical stress is attributable, in the main, to removing the weight of the gas generating device from the inflatable bag. The avoidance of thermal stressing of the bag material is the result of the expansion of the gases into the interior of the bag and the intensive cooling effect associated with such expansion. Since the expansion of the gas takes place at high velocities due to the prevailing pressure conditions, there is always the assurance that the bag is inflated within the required time period with an adequate quantity of gas.

In the shock absorption system according to the present invention, the adaptation of the speed with which the solid charge experiences combustion or disintegration, of the amount of compressed gas obtained, of the velocity with which the compressed gases flow into the interior of the bag and of the temperature at which the gases enter the bag of different sizes and heat resistances presents no difficulties whatever. All that is necessary is to select a suitable gas-generating charge and also to select the control of the charge geometry and/or the geometry of the opening or openings connecting the gas generating space with the inflatable bag.

Solid charges in the shape of discs or wound foils have proven to be particularly effective. In addition to outlet openings from the gas-generating space in the form of holes, slots and annular gaps, the outlet openings may also assume the shape of nozzles of converging or converging-diverging cross-section, especially where extreme requirements concerning the velocity of the gases flowing into the interior of the bag and the lowering of the gas temperature are involved.

Among the wide range of gas-generating solids which can be used as the solid charge, such materials as ammonium and/or silicone-containing plastics can be used and the following are some examples:

mixture of ammonium nitrate and/or
potassium nitrate,
activated charcoal of large specific area,
ammonium oxalate and/or
dihydroxyl glyoxime and
combustion moderators;
mixtures of
ammonium nitrate,
polybutadiene and/or
polyurethane and
combustion moderators;
mixtures of
aminoguanidine nitrate,
silicone and
combustion moderators
mixtures of
aminotetrazole nitrate,
silicone and
combustion moderators; as well as
mixtures of
aminoguanidine nitrate and/or
aminotetrazole nitrate and
combustion moderators
have proven to be particularly successful in the shock absorption system of the present invention.

In addition, the propellants of the double-base or composite type commonly used in solid fuel rockets are also well suited for use as the solid charge in the shock absorption system of the present invention.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
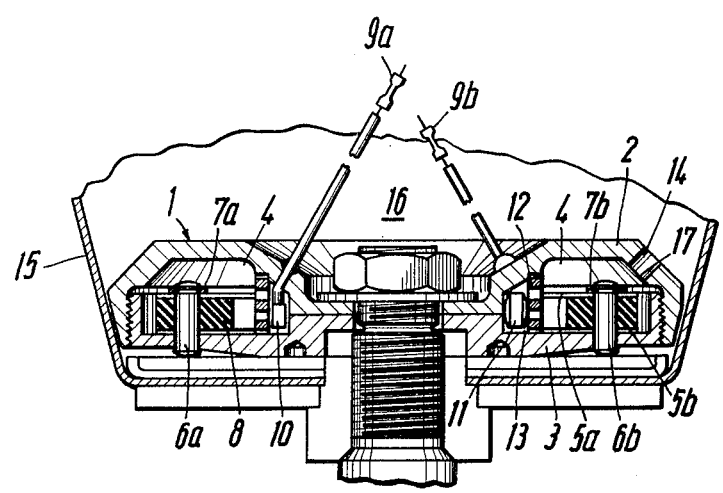
FIG. 1 is a partial cross-sectional view of the gas-generating portion of a shock absorption system incorporating the present invention.

In FIG. 1 a housing 1 is shown for generating gas from a solid charge. The gas generated within the housing 1 is used for filling an inflatable bag 15 as part of the shock absorption system according to the present invention. The housing 1 is of an axially symmetrical construction and is formed of an upper housing part 2 and a lower housing part 3 threaded into the upper part. The two housing parts 2, 3 combine to form an annular-shaped reaction reaction chamber 4. Positioned within the annular chamber is a solid charge 8 located between a pair of metal cover sheets 5a, 5b. Pins 6a, 6b, in combination with the associated locking washers 7a, 7b, secure the solid charge 8 to the lower housing part 3. The solid charge 8 is in an annular-shaped disk form and is made up of a double-based rocket propellant. The metal cover sheets 5a, 5b have the same general disk-shaped configuration as the solid charge. For initiating the gas-generating process, the solid charge is ignited electrically. The ignition means includes a pair of supply lines 9a and 9b with a detonator cap 10 associated with each of the lines, only one is shown in FIG. 1, and a pellet charge 11. The detonator caps 10 and the pellet charge 11 are located within an antechamber 13 formed in the reaction chamber separated from the remainder of the reaction chamber by a perforated sheet metal cylinder 12 which extends upwardly between the lower and upper portions of the housing.

From the reaction chamber 4, the pressurized gases, generated by the ignition of the solid charge, flow through a number of outlet openings 14 in the upper part 2 of the housing 1 into the interior 16 of the inflatable bag 15. As the gas flows from the reaction chamber through the openings 14 into the bag, the gas temperature, due to cooling as a result of expansion, experiences a drop to a value which the material of the inflatable bag can withstand. Prior to the ignition of the solid charge, the openings 14 from the reaction chamber are blocked by a closure or barrier 17. The closure 17 can be formed by an aluminum foil secured across the opening within the reaction chamber.

Figure 2:
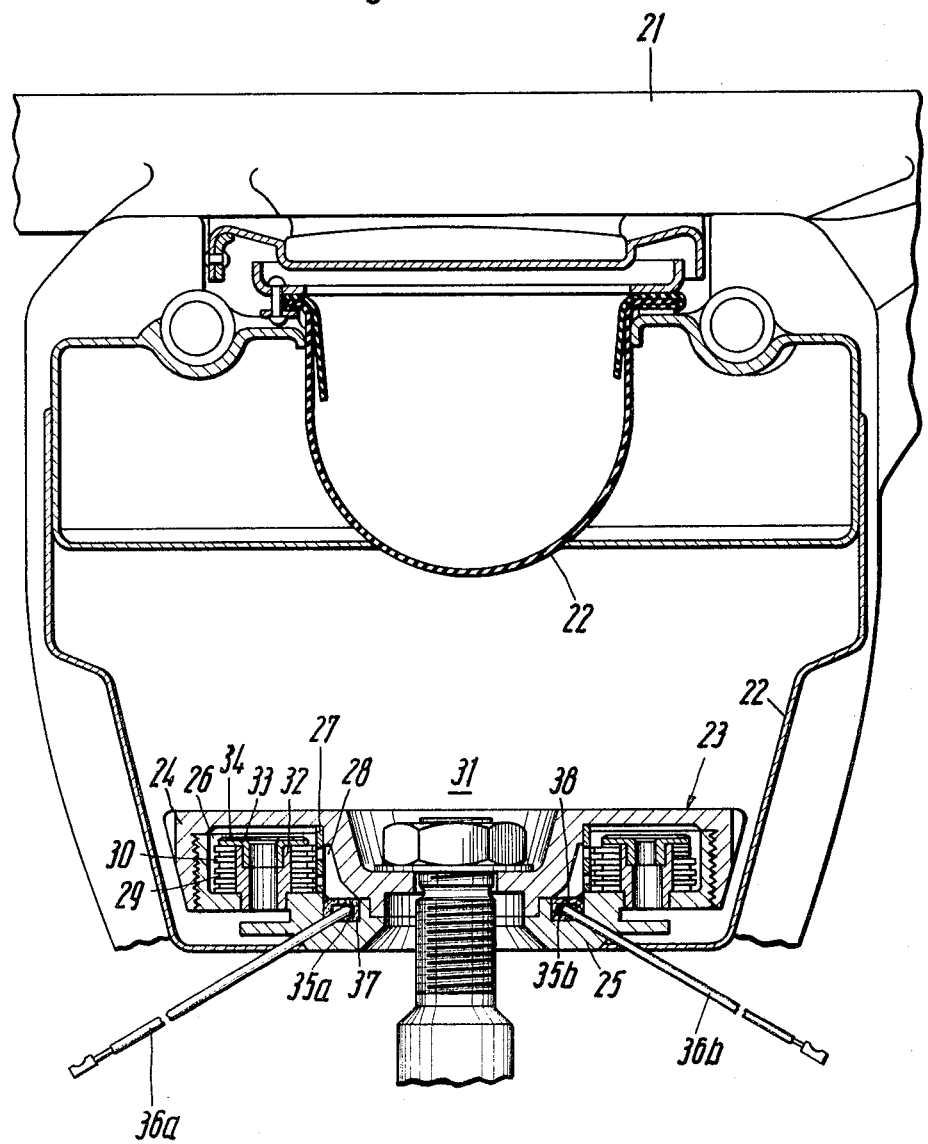
FIG. 2 is a view, similar to FIG. 1, showing another embodiment of the gas-generating portion incorporated into the steering wheel of a passenger vehicle.

In FIG. 2 a steering wheel 21 for a passenger vehicle is shown. Installed within the steering wheel 21 is an inflatable bag 22 and a gas generator housing 23 in which gases are generated from a solid charge in a gas absorption system in accordance with the present invention. As with the housing 1 shown in FIG. 1, the housing 23 is formed of an upper housing part 24 and a lower housing part 25 threaded together to form an annular reaction chamber 26 with an upwardly extending perforated sheet metal cylinder 27 located within the reaction chamber and extending between the upper and lower housing parts for forming an antechamber 28 in communication with the reaction chamber 26. The solid charge within the reaction chamber consists of five annular disk-shaped members 30 each separated by a spacing ring 29. Equiangularly spaced about and extending through the spacing rings 29 and the solid charge members 30 are eight holes and a pipe section 32 is positioned in each of the holes and is open at its lower end to the interior 31 of the inflatable bag 22. A bushing 33 is located in the upper end of each of the pipe sections 32 providing an opening communicating with the annular reaction chamber 26. The opening from the reaction chamber into the pipe sections 22 is closed by a self-adhesive aluminum foil 34 stretched across the bushing 33. The closure provided by the aluminum foil 34 remains in place until the initiation of the gas-generating process. When the generation of gas commences the closure is displaced permitting flow of the gas from the reaction chamber 26 through the pipe sections 32 into the interior 31 of the inflatable bag 22. In conformance with the arrangement shown in FIG. 1, the solid charge members 30 are ignited by electrical means, for instance, two detonator caps 35a, 35b and by supply lines 36a, 36b. The detonator caps 35a, 35b are embedded in black powder 37 and are positioned by means of a disk 38 in the lower portion of the antechamber 28. In the arrangement shown in FIG. 2, the gas generated within the housing 23 experiences a particularly intensive cooling as it flows from the reaction chamber 26 into the interior 31 of the bag 22. This intensive cooling is attributable to the special design and configuration of the openings provided by the pipe sections 32 and the repeated deflection of the gas as it flows from the chamber 26 to the inflatable bag 22.

Further, the arrangement of the openings between the chamber and the bag provide reliable protection against any injury from the exterior of the housing to both the foil closure or barriers 34 for the openings from the reaction chamber and to the solid charges 30 within the reaction chamber.

While specific embodiments of the invention have been shown and described in detail to illustrate the application of the inventive principles, it will be understood that the invention may be embodied otherwise without departing from such principles.

What is claimed is:

1. A shock absorption system for use in motor vehicles for minimizing the danger of injury to occupants of the vehicle in the event of an accident, including an inflatable bag, a device for supplying gas for inflating said bag, and means for initiating the inflating process, wherein the improvement comprises that said device for supplying gas includes means forming an enclosed reaction chamber, said reaction chamber having openings communicating with said inflatable bag, means for forming a closure across the openings between said reaction chamber and the inflatable bag, a solid charge positioned within said reaction chamber for generating gas, said means forming an enclosed reaction chamber comprises an axially symmetrical housing comprising a lower housing part and an upper housing part threadedly secured to said lower housing part, said lower and upper housing parts combining to provide the reaction chamber with an annular configuration, a perforated cylinder positioned within the reaction chamber and concentrically of the axis of symmetry of said housing and extending between said upper and lower housing parts and forming an annular-shaped antechamber in communication with the remainder of said annular-shaped reaction chamber, and said means for initiating the inflation process located within said antechamber, so that said means for initiating the inflation process within said antechamber initiates the generation of gas from said solid charge within the remainder of said reaction chamber for the passage of the gas from said reaction chamber into said inflatable bag with said closure means displaced due to the initiation of the generation of gas.

2. A shock absorption system, as set forth in claim 1, wherein said solid charge is composed of at least one of a double-based and a composite rocket propellant.

3. A shock absorption system, as set forth in claim 1, wherein said means for initiating the inflating process comprises at least one detonator cap and a charge positioned within said antechamber.

4. A shock absorption system, as set forth in claim 3, wherein said antechamber is positioned radially inwardly of the remainder of said reaction chamber, said solid charge comprises an annular-shaped disk member located within the remainder of said reaction chamber, a metallic cover sheet positioned across the upper and lower surfaces of said solid charge, and pin-like members and locking washers securing said solid charge to said lower housing part, the openings communicating between said reaction chamber and said inflatable bag extending through said upper housing part, and said means forming a closure comprising a metal foil extending across the openings from the reaction chamber and located on said reaction chamber side of said openings.

5. A shock absorption system, as set forth in claim 3, wherein said solid charge comprises a plurality of annular-shaped disk-like members disposed in superposed relationship, and annular-shaped spacing rings positioned between each pair of adjacent said disk members, a plurality of upwardly extending pipe sections each positioned within a hole extending upwardly through said disk members and spacing rings with one end of said pipe section disposed in communication with the interior of said inflatable bag, a bushing positioned within the upper end of said pipe sections with the opening in said bushings disposed in communication with the interior of said reaction chamber, and said means forming a closure comprising a metal foil secured across the opening of each of said bushings for blocking the opening from said reaction chamber into said pipe section.

6. A shock absorption system, as set forth in claim 1, wherein said solid charge is composed of at least one of ammonium nitrate and potassium nitrate, activated charcoal of large specific area, at least one of ammonium oxalate and dihydroxyl glyoxime, and combustion moderators.

7. A shock absorption system, as set forth in claim 1, wherein said solid charge is composed of ammonium nitrate, at least one of polybutadiene and polyurethane, and combustion moderators.

8. A shock absorption system, as set forth in claim 1, wherein said solid charge is composed of aminoguanidine nitrate, silicon-containing plastics and combustion moderators.

9. A shock absorption system, as set forth in claim 1, wherein said solid charge is composed of aminotetrazole nitrate, silicon-containing plastics and combustion moderators.

10. A shock absorption system, as set forth in claim 1, wherein said solid charge is composed of at least one of aminoguanidine nitrate and aminotetrazole nitrate, and combustion mocerators.

* * * * *

UNITED STATES PATENT OFFICE
CERTIFICATE OF CORRECTION

Patent No. 3,845,970　　　　　　　　Dated November 5, 1974

Inventor(s) Günter Herrmann

It is certified that error appears in the above-identified patent and that said Letters Patent are hereby corrected as shown below:

In the heading of the patent, change:

"[30]　　Foreign Application Priority Data

Oct. 9, 1971 Germany............2150463"

to:

--[30]　　Foreign Application Priority Data

Oct. 9, 1971 Germany.........P 21 50 465.4--

Signed and sealed this 24th day of December 1974.

(SEAL)
Attest:

RUDOY M. GIBSON JR.
Attesting Officer

C. MARSHALL DANN
Commissioner of Patents